United States Patent
Na et al.

(10) Patent No.: US 6,387,340 B1
(45) Date of Patent: May 14, 2002

(54) MANUFACTURING METHOD FOR LITHIUM HEXAFLUORO PHOSPHATE

(75) Inventors: Doo-Chan Na; Byung-Won Woo; Soon-Hong Park; Jun-Ho Lee, all of Ulsan (KR)

(73) Assignee: Ulsan Chemical Co., Ltd., Ulsan (KR)

( * ) Notice: Subject to any disclaimer, the term of this patent is extended or adjusted under 35 U.S.C. 154(b) by 0 days.

(21) Appl. No.: 09/475,074

(22) Filed: Dec. 29, 1999

(30) Foreign Application Priority Data

Dec. 31, 1998 (KR) .............................. 98-63278

(51) Int. Cl.$^7$ .............................. C01B 25/10; C01B 7/19
(52) U.S. Cl. ........................................ 423/301; 423/483
(58) Field of Search ................................... 423/301, 483

(56) References Cited

U.S. PATENT DOCUMENTS

| | | | | |
|---|---|---|---|---|
| 1,914,425 A | * | 6/1933 | Henglein et al. | 423/483 |
| 3,455,650 A | * | 7/1969 | Conte et al. | 423/483 |
| 3,501,268 A | * | 3/1970 | Laran et al. | 423/483 |
| 3,607,020 A | * | 9/1971 | Smith | 423/301 |
| 5,378,445 A | * | 1/1995 | Salmon et al. | 423/301 |

FOREIGN PATENT DOCUMENTS

JP 45108 * 2/1988 .................. 423/301

OTHER PUBLICATIONS

Abstract of Japanese 06056413 published Mar. 1, 1994.*

* cited by examiner

*Primary Examiner*—Wayne Langel
(74) *Attorney, Agent, or Firm*—Harrison & Egbert

(57) ABSTRACT

A method of preparing lithium hexafluoro phosphate ($LiPF_6$) using phosphorous pentachloride ($PCl_5$), lithium chloride (LiCl), and hydrogen fluoride (HF) as raw materials. The method includes the steps of: (a) reacting the phosphorous pentafluoride with the hydrogen fluoride to prepare phosphorous pentafluoride (PF5), and (b) reacting the phosphorous pentafluoride with the lithium chloride in a hydrogen fluoride to prepare the lithium hexafluoro phosphate. Also, in this method, anhydrous hydrogen fluoride, from which moisture was removed by treating with $F_2$ gas, is used in the steps (a) and (b), and the step (b) further comprises contacting the reaction system of the step (b) with $F_2$ gas. Accordingly, as the method adopts relatively cheap raw materials, such as $PCl_5$, LiCl and the like, while a highly pure $F_2$ obtained by an electrolysis is used in the reaction system, it has an advantage in that it enables lithium hexafluoro phosphate ($LiPF_6$) to be prepared at a high yield and purity.

3 Claims, No Drawings

MANUFACTURING METHOD FOR LITHIUM HEXAFLUORO PHOSPHATE

BACKGROUND OF THE INVENTION

1. Field of the Invention

The present invention relates to a method of preparing lithium hexafluoro phosphate ($LiPF_6$) at a high yield and purity, which is one of the essential elements for a lithium ion secondary battery cell and a lithium polymer battery cell.

2. Description of the Prior Art

A lithium ion battery cell or a lithium polymer battery cell is fundamentally composed of an anode of lithium oxide, such as $LiCoO_2$, $LiNiO_2$, $LiMn_2O_4$ or the like, a cathode of a carbon material, such as graphite, and an electrolytic solution consisting of an electrolyte dissolved in an organic solvent. Examples of the organic solvent include nonaqueous solvents, such as a mixed solvent of ethylene carbonate (hereinafter, called "EC") and dimethyl carbonate (hereinafter, called "DMC"), a mixed solvent of EC and diethyl carbonate (hereinafter, called "DEC"), and the like. Moreover, lithium hexafluoro phosphate is typically used as the electrolyte.

When the battery cell is electrically charged, Li ion is inserted into, and attached to a void in the cathode, whereas, when it is electrically discharged, the Li ion attached to the cathode is returned to the anode. In this case, the Li ion moves through the electrolytic solution. As a result, in order to maintain performance of the battery throughout its life cycle, lithium hexafluoro phosphate, which is an electrolyte used in the electrolytic solution, is very strictly limited in specifications, such as purity, etc.

As a rule, lithium hexafluoro phosphate is prepared by reacting, in a concentrated hydrofluoric acid solution, lithium fluoride (LiF) with phosphorus pentafluoride ($PF_5$) which is obtained by a reaction of phosphorus pentachloride ($PCl_5$) and hydrofluoric acid (HF). In this reaction, if the reaction system for preparing lithium hexafluoro phosphate contains moisture, lithium oxyfluoro phosphate ($LiPO_xF_y$) is produced as a by-product, and lithium oxyfluoro phosphate is also partially resolved into LiF which then remains as an impurity in lithium hexafluoro phosphate. Consequently, it is preferred that the moisture content in the reaction system for preparing lithium hexafluoro phosphate is as low as possible.

A metal component contained in a raw material used in a preparing process of lithium hexafluoro phosphate, or a metal component introduced by a corrosion of an equipment, changes lithium metal ionization potential. Thus, where the metal component is contained in the electrolyte, the life of the battery cell may be shortened.

Furthermore, if moisture is contained in the final product, then lithium hexafluoro phosphate is resolved into LiF, HF, and $PF_5$, that are then converted into a gaseous state, thereby forming an internal pressure with in the battery cell. Also, as HF is reacted with the organic solvent, it has an effect on the corrosion of a case enclosing the battery cell. It adversely affects a stability of the battery cell. For these reasons, lithium hexafluoro phosphate ($LiPF_6$) used as the electrolyte is strictly limited in specifications, such as purity, moisture content, metal content, free hydrofluoric acid content, and the like.

SUMMARY OF THE INVENTION

The present invention is a method wherein HF dried completely by means of $F_2$ is used as one of raw materials for the preparation of lithium hexafluoro phosphate to fundamentally prevent lithium oxyfluoro phosphate ($LiPO_xF_y$) from being produced as a by-product and also to prevent lithium hexafluoro phosphate ($LiPF_6$) from resolving by moisture, thereby enabling lithium hexafluoro phosphate ($LiPF_6$) to be prepared at a high purity without reducing yield.

Also, the present invention is a method wherein $F_2$ gas of a high purity is introduced at a desired amount during a reaction for preparing lithium hexafluoro phosphate ($LiPF_6$) to fundamentally prevent lithium oxyfluoro phosphate ($LiPO_xF_y$) from being produced as a by-product because of moisture contained in a solid type raw material such as $PCl_5$, LiX (X=F, Br, Cl, or I), or the like and other moisture which can be introduced during the reaction, thereby enabling lithium hexafluoro phosphate ($LiPF_6$) to be prepared at a high purity.

DETAILED DESCRIPTION OF THE PREFERRED EMBODIMENTS

In a general method for preparing hydrogen fluoride, the preparation of hydrogen fluoride is carried out after basic raw materials are completely dried to control moisture. In a last step, hydrogen fluoride is passed through anhydrous sulfuric acid to remove moisture contained therein. After undergoing this drying process, hydrogen fluoride typically contains moisture of about 100 ppm, and also sulfuric acid of about 50 ppm. It is a high boiling point material, due to the passage through anhydrous sulfuric acid.

As described above, in the battery cell-grade electrolyte, the content of the metal component is very critical. Because all equipment used for the preparation of HF is made of steel, however, hydrogen fluoride itself will contain a large number of metal components.

Anhydrous hydrogen fluoride resulting from the process is unsuitable for use as a raw material for the preparation of a battery cell-grade electrolyte, because it is high in content of moisture, sulfuric acid, metal components, and the like. Therefore, this needs to be dried and purified, again.

In the present invention, the reaction formula, according to which the remaining moisture in anhydrous hydrogen fluoride is dried, is as follows:

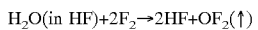

$$H_2O(\text{in HF}) + 2F_2 \rightarrow 2HF + OF_2(\uparrow)$$

This drying is carried out under the following conditions:
Bubbling time: 1 to 3 hours
Temperature: −10 to 30° C.
Flow rate: 1 to 1,000 g/hr As shown in the reaction formula, as moisture in hydrogen fluoride is reacted with $F_2$ gas to be converted into the hydrogen fluoride, oxyfluoride ($OF_2$) is discharged which is very low in boiling point, such as −145° C., so that it is easily volatilized out after the reaction.

The present invention also relates to a purification of $PCl_5$ and LiCl that are solid raw materials. Commercially available compounds generally have respective specifications inherent in purity, moisture content, metal component, and the like. Even though it is well known that the use of a raw material of a high purity results in an increase in quality of a final product, this causes the manufacturing-cost to be increased, thereby decreasing competitiveness. Thus, the present invention adopts $PCl_5$ and LiCl that are relatively cheap raw materials containing some impurities, such as moisture, etc.

As described above, if the raw material contains moisture, lithium oxyfluoro phosphate ($LiPO_xF_y$) may be produced which is very difficult to be isolated by a recrystallization.

The present invention is characterized in that $F_2$ gas is introduced into a reaction system to completely remove moisture contained in the solid raw materials, thereby fundamentally preventing lithium oxyfluoro phosphate ($LiPO_xF_y$) from being produced.

Moreover, even when lithium oxyfluoro phosphate ($LiPO_xF_y$) is produced during the reaction, this is converted into lithium hexafluoro phosphate ($LiPF_6$) and oxyfluoride ($OF_2$) by $F_2$ gas in accordance with the present invention, thereby increasing yield.

In addition, another characteristic of the present invention is that, for controlling the metal components, equipment coated with a fluorine resin, such as polytetrafluoroethylene (hereinafter, called "PTFE"), is used for all processes, and that pipe lines made of a PFA resin, such as tetrafluoroethylene perfluoroalkylvinylether copolymer are also used. Futhermore, two reactors are used.

The reasons why all the equipment is coated with the fluorine resin and the pipe lines are made of the PFA resin, are as follows.

In the prior art, there was used a reactor made of a material capable of withstanding anhydrous hydrofluoric acid, such as a monel metal, a Ni base alloy, a Cr base alloy, or the like. However, such a material is very expensive, and therefore disadvantageous in view of a commercial factors. Moreover, if this material is exposed to air, then it is in contact with moisture, and it can be corroded.

Where the equipment used in the reaction is corroded, a product will be inevitably contaminated with the corroded materials. Such contaminants act as a factor which increases a metal content in the product.

Where the equipment is contaminated, it must be repaired throughout all processes. This causes a great increase in maintenance and repair expenses, and therefore, results in a process inefficiency.

Furthermore, the main reason why two reactors are used, is because it allows manufacturing-cost to be reduced through the use of a relatively cheap raw material, and also allows the content of the metal components to be decreased.

In lithium hexafluoro phosphate ($LiPF_6$) in accordance with the present invention, either PF5 or $PCl_5$ can be used as a basic raw material. However, it is preferred to use $PCl_5$, because $PF_5$ is expensive compared to $PCl_5$. When HF treated and dried with $F_2$ gas is added to a solid state $PCl_5$ in a first reactor, HF and $PCl_5$ are immediately converted into gaseous $PF_5$ and HCl (a first step reaction).

Therefore, impurities that have been contained in the solid state $PCl_5$ remain in the first reactor, and only $PF_5$ and HCL, each having a high purity, are introduced into a second reactor. As a result, it is possible to prepare a highly pure lithium hexafluoro phosphate ($LiPF_6$) while using a relatively cheap $PCl_5$.

In the second reactor, the following second and third step reactions are carried out in accordance with the present invention.

Reaction formulas and conditions for preparing lithium hexafluoro phosphate ($LiPF_6$) in accordance with the present invention are as follows:

1. Reaction formulas
   a) The first step reaction: $PCl_5 + 5HF \rightarrow PF_5 + 5HCl$
   b) The second step reaction: $PF_5 + LiCl/HF$ solution $\rightarrow LiPF_6/HF$ solution
   c) The third step reaction: $LiPF_6$ solution + $F_2$ gas
2. Reaction conditions:
   a) The first step reaction: a reaction temperature of $-80°$ C. to room temperature, a reaction pressure of 6 to 28 kg/cm$^2$G, and a reaction time of 10 minutes to 3 hours.
   b) The second step reaction: a reaction temperature of $-30°$ C. to room temperature, a reaction pressure of 1 to 20, kg/cm$^2$G, and a reaction time of 1 to 3 hours.
   c) The third step reaction: a $F_2$ gas flow rate of 1 to 1,000 g/hr, a reaction temperature of $-10°$ C. to $0°$ C., and a contact time of 10 to 30 minutes.
3. Purification condition: recrystallization at a temperature of $-80$ to $0°$ C.

The present invention having a number of characteristics as mentioned above is a method of preparing lithium hexafluoro phosphate ($LiPF_6$) at a high yield of 90% or more, a high purity of 99.8% or more, a low moisture content of 20 ppm or less, and a low free-HF content of 150 ppm or less.

Meanwhile, Japanese Patent Laid-Open Publication No. Heisei 4-175,216 discloses a method in which $PCl_5$ and HF are reacted to synthesize $PF_5$ gas, and a solution of HF and LiF is prepared in a separate vessel, to which the synthesized $PF_5$ gas is then introduced to prepare $LiPF_6$. Such a preparing method is carried out under the following conditions: a molar ratio of HF to LiF ranging 10 to 20, a reaction temperature of $-30$ to $0°$ C., an introducing flow rate of $PF_5$ of 5 to 30 liter/hr, and a particle size of the produced $LiPF_6$ of 1 to 6 mm. A drawback with this method is that an expensive LiF is used as a raw material. Another drawback with the method is that lithium hexafluoro phosphate ($LiPF_6$) is obtained in a yield of below 70%. The reason for the latter drawback is because $PF_5$ gas is similar in boiling point with HCl, which is produced along with $PF_5$ from the reaction of $PCl_5$ and HF, and is lost to a great extent during a removal of HCl for the reduction of pressure reaction.

The Japanese Patent Publication mentioned above says that the moisture content in $LiPF_6$, a final product, is no more than 10 ppm, but there is no mention indicating that a dried HF is used as a raw material. Thus, it is believed that a product prepared according to the method of the Japanese Patent Publication clearly contains an impurity of $LiPO_xF_y$. It also appears that, in the method of Japanese Patent Publication, a vacuum-drying would have to be conducted for an extended period of time in order for a final product to contain moisture of 10 ppm or less. Meanwhile, Japanese Patent Laid-Open Publication No. Sho 60-251109 discloses a method in which $PCl_5$ reacts with HF+LiX(X=Cl, F, I, Br), etc., in a single reactor. In this reaction, the ratio of HF to LiX is 20 to 50 wt/wt.

As previously described, this method has a drawback in that metal components inherent in $PCl_5$, LiX, and the like may be contained in $LiPF_6$, a final product, due to the use of the single reactor. Further, there is another drawback in inevitably requiring several repetitions of recrystallization for removing the metal components, and it is difficult to use the product as a battery cell-grade materials because its yield is no more than 82% and its purity is only 99%.

Furthermore, the document makes no mention of moisture contents and metal components, which would be counter evidence of low purity.

In Japanese Patent Laid-Open Publication No. Heisei 5-279003 the patent disclosed a method wherein $PCl_5$ reacts with HF gas to produce $PF_5$ and HCL gas, the produced $PF_5$/HCL gas passes through a cooling tower at a temperature of $-40$ to $-80°$ C., and the passed $PF_5$/HCL gas is introduced into a reactor containing LiF dissolved in HF to produce $LiPF_6$.

A drawback with this method is that a yield of the reaction is no more than 65%.

EP 0643433 A1 refers to a method for directly producing $LiPF_6$ (EC/DEC) by dissolving the starting raw $NH_4PF_6$ in a battery cell-grade solvent, such as EC, DEC or the like and reacting the resultant solution with LiH. This reaction produces $NH_3$ and $H_2$ gases, and the former must be necessarily removed because it remains dissolved in the solvent.

In this process, the amount of used EC or EC solvent decreases as the reaction progress; thus the solvent must be compensated to conform with a desired concentration. Also, the reaction is only valid on the assumption that the conversion is 100%. However, it still seems that it cannot be used as electrolyte solution because there is great probability of existence of unreacted material ($NH_4PF_6$, LiH) and because there is no process for removing metal components associated with $NH_4PF_6$ and LiH, etc. Comparison between the present invention and the prior art as mentioned above is summarized in Table 1 below.

Distillation of Anhydrous Hydrogen Fluoride

A container containing HF dried with $F_2$ was heated to a temperature of 60° C. to 130° C.

HF was distilled by evaporation and condensation while maintaining a pressure within the container at 1 $kg/cm^2G$. The distilled HF was analyzed regarding moisture content by a turbidity method. The result showed that the distilled HF contained moisture of 1 ppm or less and metal components (Fe, Mn, Ca, Na, K, Pb, Zn, Cd, Ni, Mg, Al) in quite small quantities of 1 ppm or less. The dried and distilled HF in these processes was used to synthesize $LiPF_6$ through the above-mentioned first and second reaction steps.

Production of Lithium Hexafluoro Phosphate ($LiPF_6$)

A magnetic stirring bar was put into a PTFE-coated pressure reactor(the first reactor) having 1.5 liter-capacity

TABLE 1

Comparison between the invention and the prior art

| Characteristic | The invention | JP Laid-Open(Hei 4-175216) | JP Laid-Open(Sho 60-251109) | JP Laid-Open(Hei 5-279003) | EP 0643433 A1 |
|---|---|---|---|---|---|
| Raw material | ① HF dried with $F_2$ ② $PCl_5$ ③ LiCl ④ $F_2$ gas | ① HF ② $PCl_5$ ③ LiF | ① HF ② $PCl_5$ ③ LiF | ① HF ② $PCl_5$ ③ LiF | ① $NH_4PF_6$ ② organic solvent, such as EC/DEC, etc. ③ LiH |
| No. of reactor | 1 | 2 | 1 | 2 | 1 |
| Essence of technique | Using $F_2$ gas | Reacting $PCl_5$ with HF in a liquid phase | Reacting $PCl_5$ with HF in a gas phase | Using cooling tower and removing $PO_xF_y$ | Using organic solvent and directly producing electrolytic solution |
| Yield | Above 90% | 70% | 82% | 65% | — |
| Purity | Above 99.8% | Not-mentioned | 99% | Not-mentioned | Not-mentioned |
| Advantage | Capable of producing a high-yield and high-purity LiPF6, possible to control moisture and metal components | — | — | — | — |
| Disadvantage | — | Low yield, expensive raw material(LiF), low purity, impossible to control moisture | Low yield, low purity, impossible to control moisture and metal components | Low yield, low purity, impossible to control moisture | Impossible to separate unreacted $NH_4PF_6$ and LiH material, requiring to compensate lack of organic solvent, impossible to control metal components |

The following examples are for illustration purposes only and in no way limit the scope of this invention.

EXAMPLE 1

Drying of Anhydrous Hydrogen Fluoride

A bubbling tube made of PFA resin was installed within a carbon steel container having 20 kg-capacity, and 18 kg of hydrogen fluoride (boiling point: 19.2° C., moisture content: 100 ppm) was introduced into the container.

This container was dipped into a water bath and maintained at a temperature of 0° C. to 10° C.

$F_2$ gas having a purity of above 99% and a concentration of above 99% and generated by operating an $F_2$ electrolysis reactor was introduced into the container, bubbled and contacted with the hydrogen fluoride. The $F_2$ gas flow rate and contact time as reaction conditions are about 61 g/hr and 30 min., respectively.

and, 52.93 g of $PCl_5$ was introduced into the reactor. The reaction atmosphere was replaced by nitrogen gas($N_2$), and the reactor was then connected to a HF supply pipe.

Separately, 6.53 g of LiCl was introduced into a PTFE-coated pressure reactor (the second reactor) having 1.5 liter-capacity and an interior atmosphere of the reactor was replaced by nitrogen gas($N_2$), and 300 g of dry HF was then introduced into the reactor.

The first and second reactors were connected to each other and cooled down all together.

When 100 g of the product descended to 13 $kg/cm^2G$ with the passage of time, anhydrous hydrogen fluoride was supplied into the first reactor using a quantitative pump while maintaining a temperature of the reactor at –30° C. The pressure within the reactor increased to 28 $kg/cm^2G$ by an instantaneous exothermic reaction.

The first reactor was heated to a temperature of 0° C., $PF_5$ and HCL gases generated were supplied into the second reactor by opening a valve, and then both of the reactors were left until their pressures were the same.

After completing the introduction of $PF_5$ gas, the second reactor was heated to room temperature and a reaction was carried out for 2 to 4 hours at that temperature.

At room temperature, the second reactor was maintained at a final pressure of 9 $kg/cm^2G$.

When the reaction ended, the pressure within the second reactor was released, the reactor was cooled down to 0° C., and $F_2$ gas was then introduced into the reactor (35 liter/hr, 30 min.). The interior atmosphere of the reactor was replaced by $N_2$ to remove residual $F_2$ gas, products of the reaction were moved to, and filtered at a filter, and HF used as a filtering solvent was then dried in vacuum to obtain 32.7 g of $LiPF_6$(93%).

Crude $LiPF_6$ was moved to a recrystallization device, mixed with 100 g of HF, and then recrystallized at −40° C. to obtain pure $LiPF_6$. $LiPF_6$ residing in a mother liquor was recovered up to 85% by concentration and recrystallization of the mother liquor.

The recrystallized $LiPF_6$ was vacuum-dried. Analysis results of the dried product showed a purity of 99.8% or more (according to subtracting method), a moisture content of 13 to 18 ppm (according to Karl Fischer Coulometer method), and a free-HF content of 130 ppm (according to Alkalimetry method). Also, an analysis of an electrolytic solution (EC/DEC, 1:1 wt/wt, 1M) prepared using the obtained $LiPF_6$ showed an electric conductivity of 7.6 to 7.9 mS/cm. In addition, an analysis of the structure of the obtained $LiPF_6$ by an NMR showed 19F-NMR, 31P-NMR and 7Li-NMR. From such a NMR result, it could be confirmed that the obtained $LiPF_6$ is nearly identical to a standard material.

Meanwhile, even if HCl was introduced into the second reactor along with $PF_5$, HCl did not adversely affect the preparation of $LiPF_6$ because chlorine (Cl) is low in reactivity as compared with that of fluorine (F).

As apparent from the above description, the present invention provides the method of preparing lithium hexafluoro phosphate ($LiPF_6$), in which relatively cheap raw materials, such as $PCl_5$, LiCl and the like, are used while a highly pure $F_2$ obtained by an electrolysis is used in the reaction system. Therefore, the present invention has an advantage because it enables lithium hexafluoro phosphate ($LiPF_6$) to be prepared at a high yield and purity.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

We claim:

1. A method of preparing lithium hexafluorophosphate using phosphorous pentachloride, lithium chloride and hydrogen fluoride as raw materials, the method comprising steps of:

removing moisture from the hydrogen fluoride by treating with a fluorine gas so as to form anhydrous hydrogen fluoride;

reacting the phosphorous pentachloride with said anhydrous hydrogen fluoride to form phosphorous pentafluoride; and reacting the phosphorous pentafluoride with the lithium chloride and said anhydrous hydrogen fluoride to form lithium hexafluorophosphate, wherein said step of reacting the phosphorous pentafluoride comprising contacting the reaction with fluorine gas.

2. The method of claim 1, wherein the step of contacting the reaction with fluorine gas is carried out by introducing the fluorine gas at a temperature of between −30° C. and room temperature at a fluorine flow rate of 1 to 1000 g/hr under a pressure of 1 to 20 $kg/cm^2g$.

3. The method of claim 1, wherein the steps of reacting the phosphorous pentachloride and of reacting the phosphorous pentafluoride with the lithium chloride are carried out in separate reactors.

* * * * *